US012775243B2

(12) United States Patent
Moyse et al.

(10) Patent No.: US 12,775,243 B2
(45) Date of Patent: Oct. 27, 2026

(54) WRISTWATCH COMPRISING A MOVABLE WRISTLET

(71) Applicant: CARTIER INTERNATIONAL AG, Steinhausen (CH)

(72) Inventors: Romain Moyse, Montlebon (FR); Mathurin Kielpinski, Payerne (CH)

(73) Assignee: CARTIER INTERNATIONAL AG, Steinhausen (CH)

( * ) Notice: Subject to any disclaimer, the term of this patent is extended or adjusted under 35 U.S.C. 154(b) by 476 days.

(21) Appl. No.: 18/251,206

(22) PCT Filed: Jul. 8, 2021

(86) PCT No.: PCT/EP2021/069045
§ 371 (c)(1),
(2) Date: Apr. 28, 2023

(87) PCT Pub. No.: WO2022/089794
PCT Pub. Date: May 5, 2022

(65) Prior Publication Data

US 2023/0393530 A1 Dec. 7, 2023

(30) Foreign Application Priority Data

Nov. 2, 2020 (CH) .................................... 01404/20

(51) Int. Cl.
*G04B 37/14* (2006.01)
*A44C 5/14* (2006.01)

(52) U.S. Cl.
CPC .......... *G04B 37/1486* (2013.01); *A44C 5/147* (2013.01)

(58) Field of Classification Search
CPC ........ G04B 37/1486; A44C 5/147; A44C 5/14
(Continued)

(56) References Cited

U.S. PATENT DOCUMENTS

2002/0105860 A1 8/2002 Gensini

FOREIGN PATENT DOCUMENTS

CH 228243 A 8/1943
CH 320664 A 3/1957
(Continued)

OTHER PUBLICATIONS

Foreign Communication from a Related Counterpart Application, International Search Report and Written Opinion dated Sep. 9, 2021, International Application No. PCT/EP2021/069045 filed on Jul. 8, 2021.

(Continued)

*Primary Examiner* — Edwin A. Leon
*Assistant Examiner* — Kevin Andrew Johnston
(74) *Attorney, Agent, or Firm* — Conley Rose, P.C.

(57) ABSTRACT

The invention relates to a wristwatch comprising:

Figure 1:
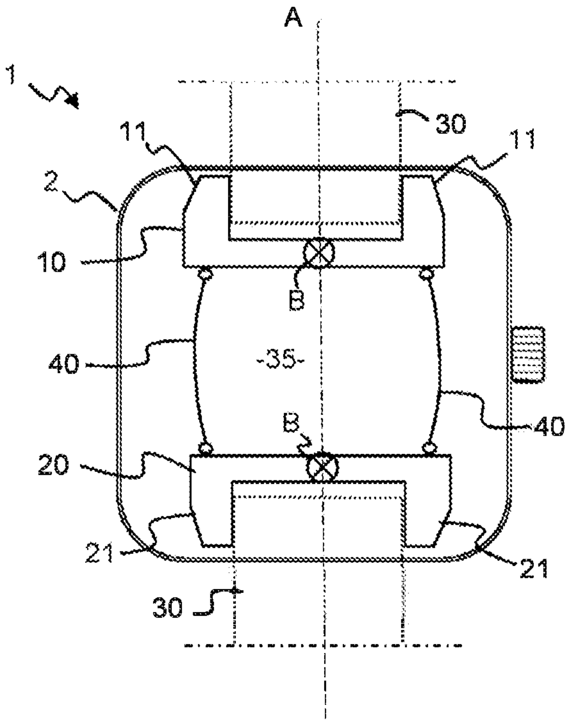

a watch case including a middle part, a glass and a back, defining a volume arranged to accommodate a movement, a wristlet through-mounted in the watch case, partially located inside said volume and mounted movably so as to slide in the middle part, the wristlet comprises a first attachment portion linked to a first end of the wristlet and a second attachment portion linked to a second end of the wristlet, the first and second attachment portions are mounted movably relative to the middle part and located inside said volume, and the wristlet comprises a linking portion located in said volume, said linking portion being attached to the first attachment portion and to the second attachment portion.

12 Claims, 4 Drawing Sheets

(58) Field of Classification Search
USPC .......................................................... 368/282
See application file for complete search history.

(56) References Cited

FOREIGN PATENT DOCUMENTS

| | | | | |
|---|---|---|---|---|
| CH | 343946 | A | 12/1959 | |
| CH | 710995 | A2 * | 10/2016 | ........... G04B 37/005 |
| CN | 108508736 | A * | 9/2018 | ............. G04G 17/08 |
| DE | 1099773 | B | 2/1961 | |
| EP | 0703512 | A2 | 3/1996 | |
| EP | 1229407 | A1 | 8/2002 | |
| EP | 3088970 | A1 | 11/2016 | |
| FR | 935435 | A | 6/1948 | |
| FR | 2825162 | A1 | 11/2002 | |
| WO | 2022089794 | A1 | 5/2022 | |

OTHER PUBLICATIONS

Foreign Communication from a Related Counterpart Application, Japanese Notice of Reasons for Refusal dated Mar. 11, 2025, Japanese Application No. 2023-526300 filed on Apr. 28, 2023.

* cited by examiner

WRISTWATCH COMPRISING A MOVABLE WRISTLET

CROSS-REFERENCE TO RELATED APPLICATIONS

The present application is a filing under 35 U.S.C. 371 as the National Stage of International Application No. PCT/EP2021/069045, filed Jul. 8, 2021, entitled "WRISTWATCH COMPRISING A MOVABLE STRAP," which claims priority to Switzerland Application No. 01404/20, filed with the Intellectual Property Office of Switzerland on Nov. 2, 2020, both of which are incorporated herein by reference in their entirety for all purposes.

The present invention relates generally to the field of watchmaking, more particularly to the field of watch casing.

Currently, a watch case is linked to a wristlet by means of a spring bar, integral with one end of the wristlet, which is engaged into holes provided in the horns. These horns are integral with the watch case and are generally applied to the case at the middle part, or molded in one piece with the case if it is made of plastic or of a material allowing extrusion or machining from a block of material. There exists a large number of horn arrangements, paired or central, allowing the attachment of the wristlet. For example, document EP0703512 describes a watch case provided with a middle part integrating two pairs of horns located on either side of the middle part.

The applicant had the idea of proposing a new concept of the watch case, having a flexible outer shell. This concept is the subject of a patent application, filed the same day as the present application, having the title "Deformable Watch Case," the content of which is incorporated by reference in the present application. The production of such a watch case poses a problem with the arrangement of the wristlet and its link to the case. In fact, the outer surface of the latter not defining a fixed baseline, and also not having a mechanical structure allowing enduring the mechanical stresses, particularly tension, that a wristlet can induce, an attachment of the wristlet to the case itself is poorly suited. Moreover, applying horns to the rigid elements of the frame has the consequence of having linking points of the wristlet distant from the periphery of the case. This poses other problems, particularly in terms of ergonomics and comfort.

The present invention has the goal of proposing a solution allowing linking a wristlet to a watch case of a new type. In addition, this solution can also be adapted to more conventional watch cases, i.e. with a rigid shell; it then has qualities of comfort and suitability that the watch cases of the prior art do not have.

To this end, a first aspect of the invention relates to a wristwatch comprising:

- a watch case including a middle part, a glass and a back, defining a volume inside of which a movement is placed,
- a wristlet through mounted in the watch case, partially located inside said volume and mounted movably so as to slide within the middle part.

A wristwatch of this type can be adapted to different types of wrists and to different ways of wearing a watch, for example by sliding the watch case along the wristlet. It also allows increasing comfort by avoiding any contact between a protruding part of the watch case and the wrist of its user. Finally, a wristlet mounting of this type is particularly robust because it does not require an attachment element such as external spring bars between the wristlet and the watch case.

The wristlet comprises a linking portion located in said volume. The linking portion can be different from a main portion of the wristlet adapted to surround a wrist and can facilitate the mounting of the watch case to the wristlet and/or the movement of the watch case relative to the wristlet. For example, the linking portion can comprise abutment means and/or an enlargement or an excess thickness relative to the main portion of the wristlet. This main portion can consist of a single strand or two strands.

Advantageously, the middle part comprises two pass-through slots arranged to allow sliding of the wristlet and located on either side of the watch case, i.e. on either side of the middle part. These pass-through slots are preferably parallel to one another and/or perpendicular to a longitudinal axis of the wristlet when set flat.

Advantageously, the middle part comprises at least one abutment surface around each of said pass-through slots and the linking portion comprises an excess thickness and/or an enlargement arranged to come into abutment against said abutment surfaces. An embodiment of this type allows simply limiting movement of the watch case relative to the wristlet.

The wristlet comprises a first attachment portion linked to a first end of the wristlet, and a second attachment portion linked to a second end of the wristlet; the first and the second portion are mounted movably relative to the middle part, the first and the second attachment portions are located inside said volume and the linking portion is attached, on the one hand, to the first attachment portion and, on the other hand, to the second attachment portion.

Preferably, the first attachment portion and the second attachment portion differ from the linking portion and/or from a main portion of the wristlet, for example in shape, in dimension or in material.

Advantageously, the middle part comprises at least one abutment surface around each of said pass-through slots and each of the first and the second attachment portions comprise or define an excess thickness, an enlargement and/or a protrusion arranged to come into abutment against said abutment surfaces. The wristlet can then comprise a main portion, two attachment portions and a linking portion composed of one or more elements such as one or more arms. An embodiment of this type allows simply limiting movement of the watch case relative to the wristlet.

Advantageously, the linking portion is arranged to allow at least one degree of freedom between the first attachment portion and the second attachment portion. Preferably, the linking portion allows two or three degrees of freedom. Thus, the first attachment portion can be movable relative to the second attachment portion, which can allow in particular limiting the forces or friction which can be applied to a protruding bone of the wrist, thereby obtaining a wristwatch having even greater comfort and adaptability.

Advantageously, each of the first attachment portion and the second attachment portion is mounted movably in translation and in rotation relative to the middle part. A watch of this type allows comfortable wearing due to adaptation to any type of wrist shape, as well as to the movements of this wrist, due to the mobility of the first and of the second attachment portion. In particular, friction and/or the forces of the horns on the wrist or on a bone of the wrist can be limited or cancelled.

Advantageously, the wristwatch according to the present invention comprises an axis passing through the first attachment portion and through the second attachment portion, the first attachment portion and the second attachment portion being arranged to be movable in translation at least along this axis. Preferably, the axis passes through a center of the first attachment portion and of the second attachment portion. This axis can be parallel or congruent with a longitudinal axis of the wristlet when set flat. For example, the first attachment portion and/or the second attachment portion can also be movable in translation along another axis perpendicular to this longitudinal axis.

Advantageously, the linking portion is an element attached to the wristlet preferably comprising at least one flexible and/or elastic arm. This attached linking portion allows a wide selection of linking portions adapted to any type of watch case. For example, the linking portion can comprise a cable or a portion of cable and/or a flexible or elastic arm. A linking portion of this type can allow greater freedom of movement of the first and of the second attachment portions relative to the middle part, and thereby adaptation to different forms of wrist.

Alternatively, the linking portion is formed in a single piece with the wristlet, which allows offering a simpler and more robust wristlet. For example, the linking portion can be manufactured with the wristlet by molding or overmolding. Finally, the linking portion of the wristlet can comprise one element, two elements or more, of the same shape or with different shapes.

Advantageously, the first and the second attachment portion are elements attached to the wristlet. The linking portion is then arranged to join or link the first attachment portion to the second attachment portion. This embodiment thus leaves a wide flexibility in the selection of the wristlet and in particular of its material. A linking portion composed of two elements, the first attachment portion and the second attachment portion, can form an eyelet defining an opening.

Alternatively, the wristlet, the first attachment portion, the second attachment portion and the linking portion are formed in a single piece. The first attachment portion, the second attachment portion and a linking portion composed of two elements formed as a single piece can form an eyelet defining an opening, preferably arranged to be superimposed on the movement. In addition, the eyelet can define an enlargement arranged to come into abutment with the abutment surfaces.

Advantageously, the middle part is deformable or flexible. Thus, not only the assembly formed by the first and second attachment portions and the linking portion can move relative to the middle part, but the middle part itself can deform in order to provide a maximum of comfort and adaptability to its wearer. The system for mounting the wristlet which, as mentioned above, is not attached to the case, does not limit or limits slightly the deformations of the case. Attachment of the wristlet to the middle part or to the case would in fact adversely affect the flexibility of the deformations of the latter.

Advantageously, the watch case comprises a container arranged to contain the watch movement and in which the linking portion is arranged between the container and the back. It should be noted that the volume defined by the middle part, the glass and the back can be adapted to accommodate in particular the linking portion and the movement without interference.

Advantageously, the container is arranged to be supported at least partially by the linking portion, which can allow further increasing the comfort of the watch, as well as its visibility.

Another unclaimed aspect of the present invention relates to a wristwatch comprising:

- a watch case including a middle part, a glass and a back, defining a volume in which a movement is placed,
- a wristlet through-mounted in the watch case, partially located inside said volume and mounted movably so as to slide in the middle part.

In addition, a wristwatch of this type can comprise one or more additional features described earlier with reference to the first aspect of the invention.

Figure 2:
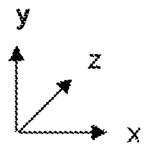
Figure 2:
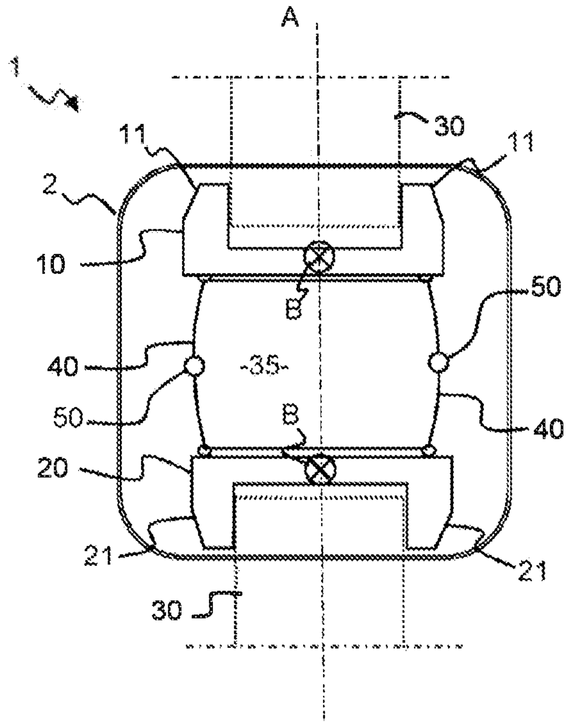
Figure 3:
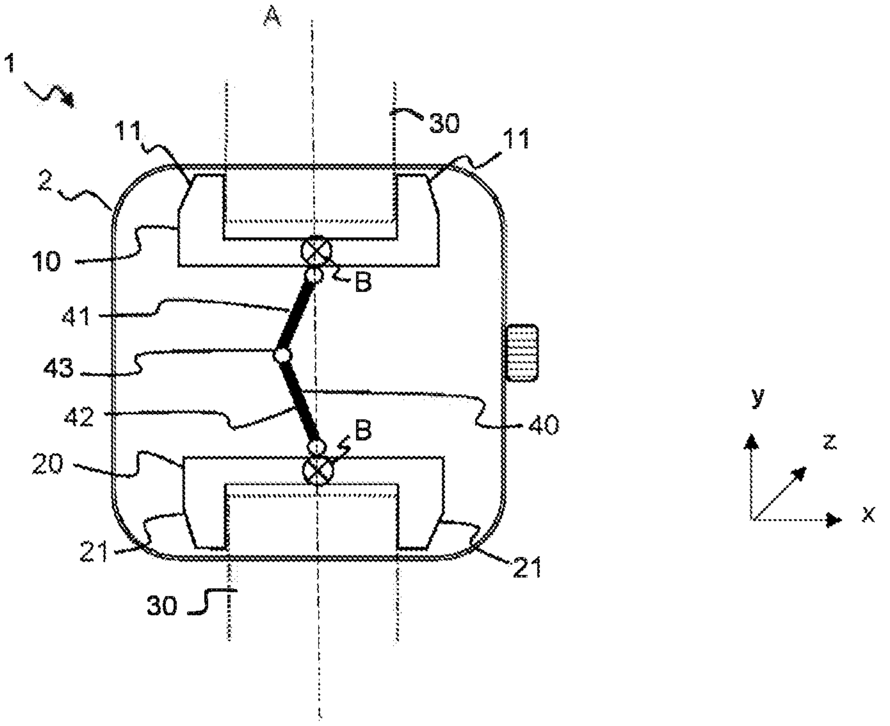
Figure 4:
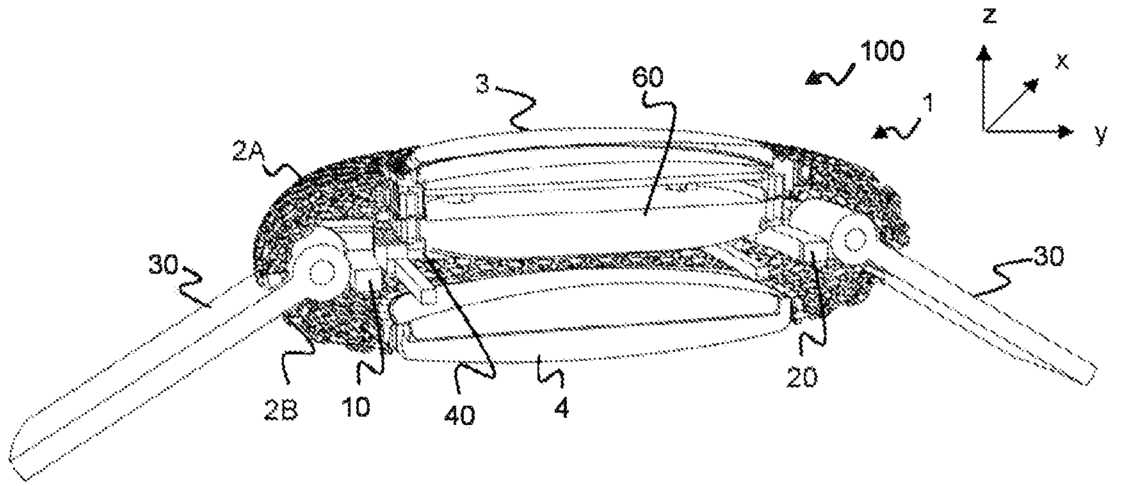
Figure 5:
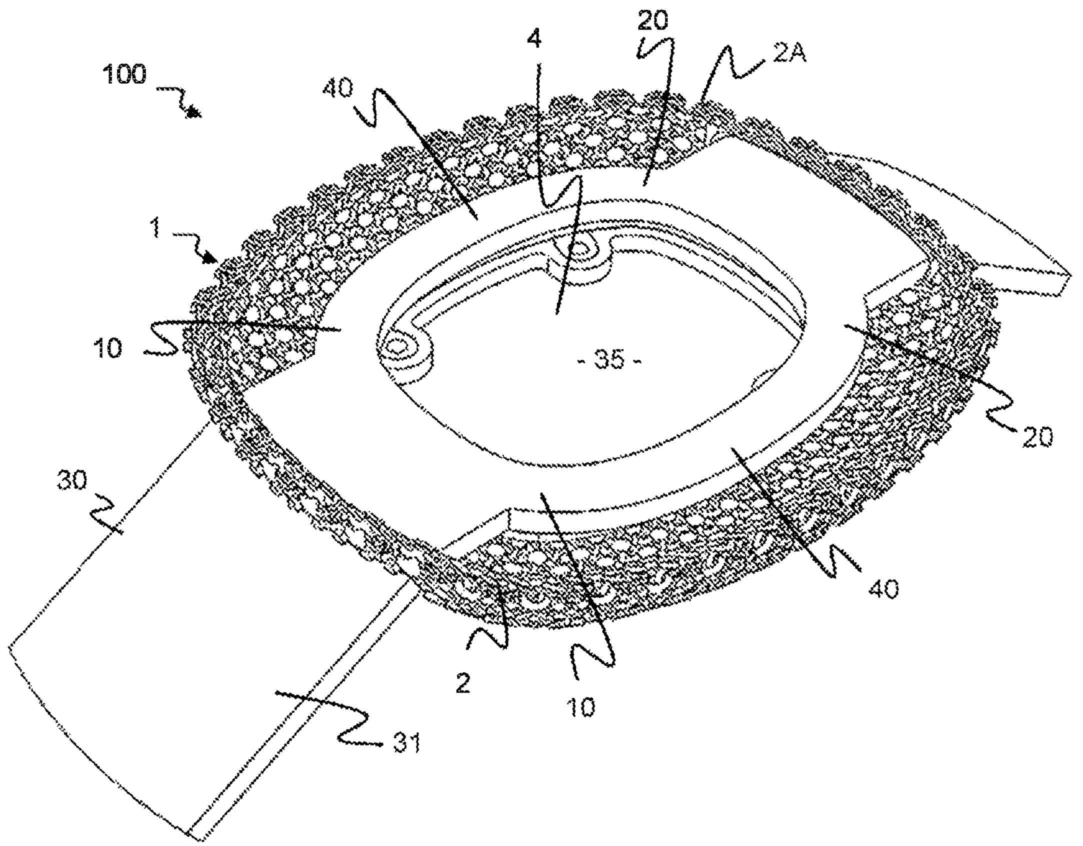
Figure 6:
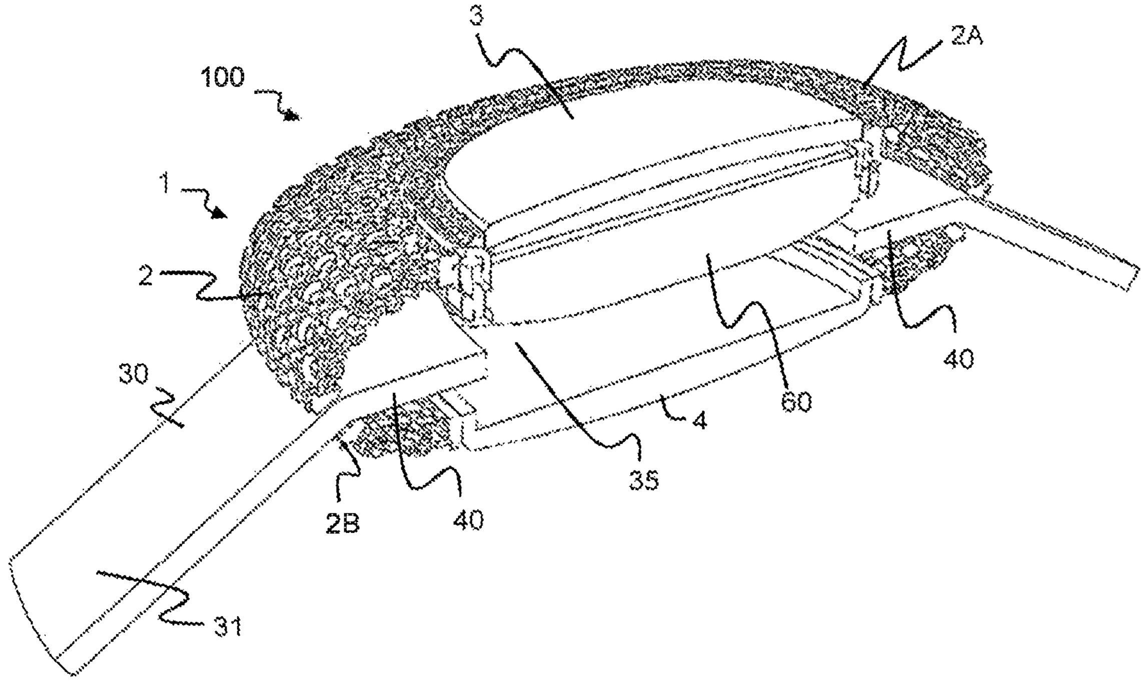
Figure 7:
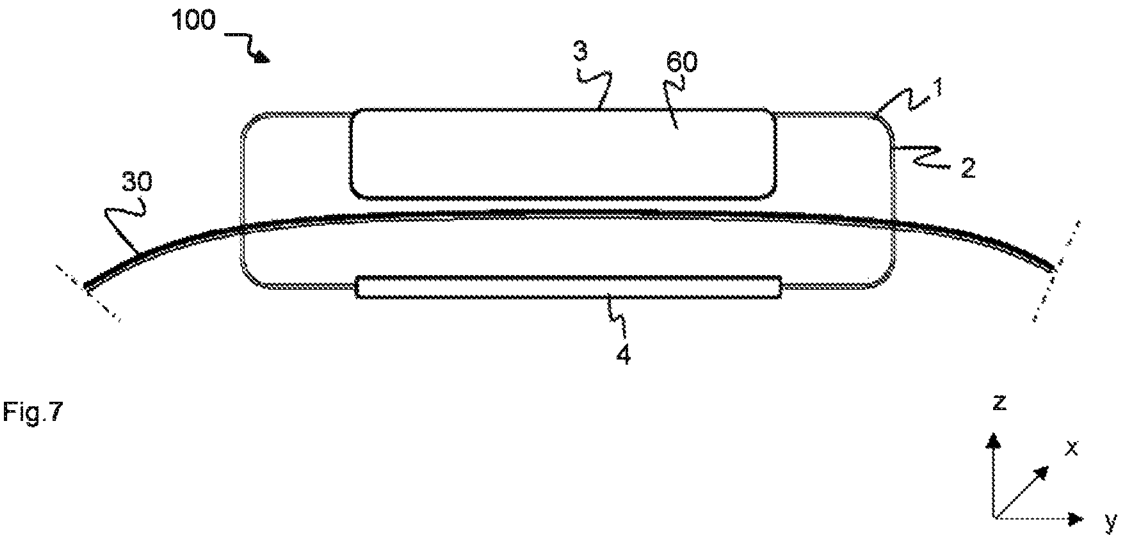

Other characteristics and advantages of the present invention will appear more clearly upon reading the detailed description that follows of embodiments of the invention given by way of examples that are in no way limiting and illustrated by appended drawings, wherein:

FIG. 1 shows a simplified schematic of a wristwatch case according to a first embodiment of the present invention, FIG. 2 shows a simplified schematic of a wristwatch case according to a second embodiment of the present invention, FIG. 3 shows a simplified schematic of a wristwatch case according to a third embodiment of the present invention, FIG. 4 shows a three-quarter view of a wristwatch according to a fourth embodiment of the present invention and comprising a watch case according to FIG. 2, FIG. 5 shows a three-quarter section view along a frontal plane of a wristwatch according to a fifth embodiment of the present invention, FIG. 6 shows a section view along a sagittal plane of a wristwatch according to the fifth embodiment of FIG. 5, FIG. 7 shows a profile section view of a wristwatch according to a sixth embodiment of the present invention.

Although particularly suited to a watch case provided with a flexible shell, as mentioned above, the present invention can be adapted to a rigid watch case. As will be understood hereafter, it allows housing any type of mechanical, electromechanical or completely electronic movement by means of a container, but mounting via a casing ring can also be contemplated, depending on the sealing criteria which must be satisfied.

According to one aspect of the invention, the wristlet is movable and/or sliding relative to the watch case and comprises a linking portion introduced through the watch case and a main portion arranged to surround a wrist. According to another aspect of the present invention, attachment portions of the wristlet can be movable and/or attached by the linking portion, preserving their mobility at least relative to the middle part of the watch case and/or of one relative to the other.

FIG. 1 shows a first embodiment of a watch case 1 provided with a wristlet 30 passing through the watch case 1 and comprising attachment portions linked by a linking portion and mounted movable relative to the middle part and to the watch case.

The watch case 1 is shown in perspective with a cutaway so as to show the interior of the watch case 1. The watch case 1, also called the case 1, comprises a middle part 2, closed by a glass and a back, not shown in FIG. 1. The glass and the back are conventionally installed on opposite faces of the case 1, the glass being mounted on an upper face of the case 1 and the back being mounted on a lower face of the case 1.

A first attachment portion 10 comprising at least one first horn and for example two first horns 11 in FIG. 1 is located in a volume defined by the middle part 2, the glass and the back. In addition, a second attachment portion 20 is also located inside the volume and comprises at least one second horn and for example two second horns 21.

Each attachment portion 10, 20 is arranged to allow the attachment of one end of the wristlet 30. For example, a pin can be passed into each end of the wristlet and be engaged in the first horns or the second horns, as is known to a person skilled in the art. Alternatively, any other type of system for attaching the wristlet 30 to the first attachment portion 10 and the second attachment portion 20 can be considered. The middle part 2 can comprise pass-through slots opposite to one another and arranged to allow the introduction of the ends of the wristlet 30 inside the middle part 2, i.e. inside the volume.

The first attachment portion 10 and the second attachment portion 20 are mounted movable inside the volume, that is to say they can move relative to the middle part 2 at least along a degree of freedom. For example, the wristlet defines an axis A passing through the first and second attachment portions or through the first and second horns (along the axis y in FIG. 1) and the first attachment portion 10 and/or the second attachment portion 20 can move at least along this axis A, for example according to a translation movement.

Preferably, the attachment portions 10, 20 can have other degrees of freedom relative to the middle part 2, for example displacement in height (along axis z of FIG. 1) and/or laterally (along axis x of FIG. 1). In addition, the attachment portions 10, 20 can be movable in rotation around a pivot point B relative to the case 1 as well as with respect to one another.

The first attachment portion 10 and the second attachment portion 20 are linked to one another by an attached linking portion and preferably by a linking portion comprising two elements in the embodiment of FIG. 1. The linking portion 40 of FIG. 1 comprises two flexible arms, for example cable or chain portions. The linking portion 40, the first attachment portion 10 and the second attachment portion define an opening 35, which can accommodate a watch movement (not shown).

The elements of the linking portion are made of any suitable material, for example titanium and in particular of grade 5 titanium, which can allow limiting the stretching of the assembly when a tension force is applied at the wristlet 30, in order not to damage the case 1 and the middle part 2, particularly in the case of a watch case the outer shell of which is flexible.

Alternatively or in combination, the elements of the linking portion can be elastic, i.e. they can be made of an elastic material or comprise an elastic portion like a spring (not shown). The element(s) of the linking portion 40 can be permanently or removably attached to each of the first and of the second attachment portion 10, 20, for example by means of loops or of anchorages in the body of the first and of the second attachment portion 10, 20.

Due to the linking portion 40 of the wristlet 30, the first attachment portion 10 and the second attachment portion 20 are articulated to one another, i.e. they are linked, one to the other, with at least one degree of freedom. A movement of the first attachment portion 10 can therefore take place relative to the second attachment portion 20, but this movement will be limited by a feature of the linking portion 40, for example its length, its flexibility or its elasticity.

Thus spreading, pivoting or height offset (along the axis z of FIG. 1) movements of the first and second attachment portions can be tolerated, but limited by the linking portion 40, for example to lengths of a few millimeters to 1 cm.

The movements of the first and second attachment portions can also be limited by the abutment portions. For example, if the middle part 2 is sufficiently rigid, its inner surface can comprise abutment portions arranged to limit movement of the first attachment portion 10 and/or of the second attachment portion 20 toward the outside of the middle part 2. The abutment portions can be located in proximity to or around the pass-through slots of the wristlet (not shown).

FIG. 2 shows another embodiment of the present invention, identical to the first embodiment according to FIG. 1, except that the linking portion 40 comprises a single cable or flexible arm mounted sliding at each of the first attachment portion 10 and of the second attachment portion 20. Thus, the relative movements of the first attachment portion 10 and of the second attachment portion 20 can easily be limited, for example to the length of the linking portion 40, while still allowing movements in several degrees of freedom. In addition, the linking portion 40 surrounds or borders an opening 35.

Optionally, the linking portion 40 can be attached to the middle part or to the back by means of one or more anchorages 50 on which the linking portion 40 can be mounted sliding. As an alternative or in combination, the anchorage can be in the form of a winder (not shown) allowing increasing the length of the linking portion 40 in the event of a load on the wristlet resulting in a movement of the first attachment portion 10 and/or of the second attachment portion 20 toward the outside of the middle part 2. The winder can comprise return means allowing decreasing the length of the linking portion 40 when the load has ceased. A linking portion of this type can be used with a wristlet in the form of a single loop, i.e. having a single strand.

FIG. 3 shows a third embodiment identical to the two preceding embodiments except for the linking portion 40, which here is a rigid arm. For example, the linking portion 40 can be formed from a single rigid segment which can be attached to the first and second attachment portions by mechanical connections of the pivot or ball joint type. In FIG. 3, the linking portion 40 is shown with two rigid segments 41 and 42 with different lengths linked by a pivot or a ball joint 43. Alternatively, the rigid segments could have the same length and/or more than two segments could be contemplated, such as three rigid segments or more.

In addition, the rigid arm can be telescopic, i.e. made from two segments sliding one within the other, or can comprise two segments articulated to one another, of which at least one and preferably both are telescopic. The rigid arm or the segments of the linking portion can have a flat cross-section, preferably with a small thickness, so as to reduce the bulk within the middle part 2.

FIG. 4 shows a section view in elevation of a fourth embodiment of the case 1 according to the present invention, as well as a watch 100.

The watch 100 comprises the case 1 according to a first embodiment, comprising the middle part 2, a glass 3 and a back 4 as well as a container 60 containing a watch movement. This fourth embodiment applies to a watch case comprising a flexible shell, as previously mentioned. The middle part 2 comprises or is made of a flexible, i.e. deformable, external wall 2A. Thus, the wristlet can assume the shape of the wrist of the user in order to maximize comfort.

For example, the wall 2A can be made of a network of articulated elements such as a knitted fabric, preferably metallic, or a set of meshes, the more or less dense interlacing of which forms a grid, a lattice or a reticule. Alternatively, the wall 2A can be made of a flexible material such as an elastomer. Preferably, the back can remain rigid.

This flexible wall 2A can allow contributing to the comfort and to the adaptability provided by the attachment portions 10, 20, linked by the linking portion 40, for example according to the first embodiment of FIG. 1, by adapting themselves to all wrist shapes and by allowing original case and middle part shapes.

The watch 100 can comprise a wristlet 30 attached to the watch case 1 by means of the attachment portions 10, 20 and introduced into the middle part 2 by slots 2B. The wristlet 30 can be made of leather or any other suitable material, and can comprise an opening for a pin buckle or a folding buckle. In one embodiment, the wristlet can be made with a network of articulated elements similar to that of the wall 2A. Alternatively or in combination, the wristlet can be made of a single strand of elastic material and not comprise an opening.

It should be noted that the watch 100 and the wristlet 30 can be adapted to all the embodiments of the watch case 1 described in the present description.

In addition, the element(s) of the linking portion 40 are positioned between the container 60 and the back 4, but the container 60 can be supported at least partially by the linking portion. For example, an outer surface of the container 60 or a structure supporting the container 60 can be arranged to rest against the linking portion 40.

The container 60 can comprise the anchorages 50 previously described, or the linking portion can be introduced into a structure supporting the container 60, for example in a sliding manner. The support of the container 60 by the linking portion 40 can allow movement of the container 60 depending on the movements of the first and second attachment portions 10, 20, i.e. depending on the movements of the wrist.

FIGS. 5 and 6 show a section view in elevation of a fifth embodiment of the watch 100 according to the present invention. In this fifth embodiment, the watch case 1 is equivalent or similar to the watch case 1 of the preceding embodiments.

In this fifth embodiment, the wristlet 30 is formed in one piece, i.e. a first attachment portion 10, a second attachment portion 20 and a linking portion 40 composed of two arms are formed of a single element, i.e. integrally with the wristlet 30. The wristlet 30 then defines a main portion 31 suitable for surrounding a wrist of the wearer and is typically made of flexible material, of leather, of rubber or of another polymer. The first attachment portion 10 and the second attachment portion 20 are thus enlarged portions of the wristlet 30 relative to the main portion 31.

The wristlet 30 is mounted movably relative to the case 1 and passes through the interior of the latter. The wristlet 30 thus includes an eyelet defined by the first attachment portion 10, the second attachment portion 20 and the linking portion 40 and defining an opening 35. This opening 35 is preferably substantially superimposed on the movement 60, in order to leave it a passage, and/or to free a space allowing locating a rigid or elastic support (not shown) between the back 4 and the movement 60.

The wristlet 30 can thus be manufactured in a single piece, for example by weaving, cutting, stamping or molding, i.e. the wristlet can be formed as a single element. Different materials can be used by overmolding, particularly for the linking portion and/or the attachment portions.

The wristlet 30 can be introduced through the watch case by pass-through slots 2B provided in the middle part 2, as previously described (see FIG. 6). The inner wall portion of the middle part 2 located around the pass-through slots 2B can thus define abutments for said eyelet formed by the wristlet 30, in particular for the first attachment portion 10 and the second attachment portion 20 larger than the main portion 31. These abutments then allow limiting the relative movements between the wristlet 30 and the watch case 1.

In other words, a certain clearance exists between the first and second attachment portions 20 and the respective portions of the middle part that face them, so as to allow relative movement of the watch case 1 relative to the wristlet 30, for example a translation movement.

Other elements located inside the case can also serve as abutments, particularly the linking portion 40 or the container 60. Alternatively or in combination, one or more anchorages (not shown in FIGS. 5 and 6) can also limit the relative movement of the watch case 1 relative to the wristlet 30, for example by interference with the edges of the opening 35, the first and second attachment portions 10, 20 and/or the linking portion 40.

FIG. 7 shows a profile section view of a sixth embodiment of the watch 100 according to the present invention. In this embodiment, the wristlet 30 is through-mounted in the watch case 1 and is passed through the watch case 1 via slots which are not shown. The wristlet 30 thus comprises a single main portion to surround the wrist and does not comprise attachment portions or linking portions. The wristlet 30 can be arranged in the inner volume of the watch case 1 between the movement 60 and the back 4.

Thus, the wristlet 30 according to the sixth embodiment can be simplified relative to the other embodiments and may not comprise a linking portion and/or an attachment portion. The watch case 1 can be movable in translation relative to the wristlet 30 and/or can slide freely along the wristlet 30. Alternatively, the wristlet can comprise a linking portion (not shown) located in the watch case and defining an abutment, an enlargement or an excess thickness so as to limit the movement of the watch case 1 along the wristlet 30.

Alternatively or in combination, the linking portion can comprise an aperture (not shown) accommodating a finger, attached to the back 4, to the middle part 2 or movement 60, the finger coming into abutment on the ends of the aperture to limit the movement of the wristlet 30. Alternatively or in combination, the wristlet can comprise abutment portions outside the watch case.

It will be understood that various modifications and/or improvements, obvious to a person skilled in the art, can be applied to the different embodiments of the invention described in the present description.

In particular, the embodiments above can be combined totally or partially. For example, a linking portion can combine a cable with a rigid arm. The linking portion can comprise one, two, three or four elements or more, attached or of a single part, with different lengths and/or different shapes, which can allow different movements of the attachment portions.

The present invention is not limited to a first and a second attachment portion located inside the middle part 2, but can also comprise first and second attachment portions located completely or partially outside the middle part 2.

The first and the second attachment portion are not limited to two horns, but each can comprise a single horn, three horns, four horns or even more. Finally, the middle part 2 can assume any type of shape such as oval, square, rectangular, circular, and triangular, with straight or rounded edges and with sharp corners or curves.

The invention claimed is:

1. A wristwatch comprising:

a watch case including a middle part, a glass, and a back, defining an empty volume arranged to accommodate a container containing a movement, a wristlet through-mounted in the watch case, partially located inside said volume and mounted movably so as to slide within the middle part, wherein the wristlet comprises a first attachment portion linked to a first end of the wristlet and a second attachment portion linked to a second end of the wristlet, wherein the first and the second attachment portions are mounted movably relative to the middle part, wherein the first and the second attachment portions are arranged inside said volume, wherein the wristlet comprises a linking portion located in said volume, said linking portion being attached to the first attachment portion and to the second attachment portion, wherein the linking portion is slidable with regard to the middle part, and wherein the linking portion is formed in a single part with the wristlet.

2. The wristwatch according to claim 1, wherein the middle part comprises two pass-through slots arranged to allow sliding of the wristlet and located on either side of the middle part.

3. The wristwatch according to claim 2, wherein the middle part comprises at least one abutment surface around each of said pass-through slots and wherein the linking portion defines an excess thickness, an enlargement and/or a protrusion arranged to come into abutment against said abutment surfaces.

4. The wristwatch according to claim 2, wherein the middle part comprises at least one abutment surface around each of said pass-through slots and wherein each of the first and the second attachment portions comprises an excess thickness, an enlargement and/or a protrusion arranged to come into abutment against said abutment surfaces.

5. The wristwatch according to claim 1, wherein the linking portion is arranged to allow at least one degree of freedom between the first attachment portion and the second attachment portion.

6. The wristwatch according to claim 1, wherein the first attachment portion and the second attachment portion are each mounted movably in translation and/or in rotation relative to the middle part.

7. The wristwatch according to claim 1, also comprising an axis passing through the first attachment portion and through the second attachment portion, the first attachment portion and the second attachment portion being arranged to be movable in translation at least along this axis.

8. The wristwatch according to claim 1, wherein the linking portion comprises at least one flexible and/or elastic arm.

9. The wristwatch according to claim 1, wherein the first attachment portion and the second attachment portion are elements attached to the wristlet.

10. The wristwatch according to claim 1, wherein the wristlet, the first attachment portion, the second attachment portion and the linking portion are formed in a single piece and form an eyelet defining an opening arranged to be superimposed on the movement.

11. The wristwatch according to claim 1, wherein the middle part is deformable.

12. The wristwatch according to claim 1, wherein the container is arranged to be supported at least partially by the wristlet or the linking portion.

* * * * *